(12) United States Patent
Sugahara et al.

(10) Patent No.: US 11,534,946 B2
(45) Date of Patent: Dec. 27, 2022

(54) MACHINE BASE OF INJECTION MOLDING MACHINE

(71) Applicant: FANUC CORPORATION, Yamanashi (JP)

(72) Inventors: Keisuke Sugahara, Yamanashi-ken (JP); Akihiro Yamamoto, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 509 days.

(21) Appl. No.: 16/653,195

(22) Filed: Oct. 15, 2019

(65) Prior Publication Data

US 2020/0122371 A1 Apr. 23, 2020

(30) Foreign Application Priority Data

Oct. 18, 2018 (JP) .............................. JP2018-196609

(51) Int. Cl.
*B29C 45/17* (2006.01)

(52) U.S. Cl.
CPC .. *B29C 45/1761* (2013.01); *B29C 2045/1767* (2013.01)

(58) Field of Classification Search
CPC ........ B29C 45/1761; B29C 2045/1767; B29C 2045/1765; Y10T 403/46; Y10T 403/33; Y10T 403/335; Y10T 403/472; F16B 9/01
USPC .......................... 425/567; 403/230, 167, 168
See application file for complete search history.

(56) References Cited

U.S. PATENT DOCUMENTS

| | | | | |
|---|---|---|---|---|
| 2,947,554 | A  * | 8/1960 | Koch ...................... | F16B 12/50 403/169 |
| 6,957,519 | B2 * | 10/2005 | Hiragaki ................... | E04C 3/29 52/854 |
| 8,561,877 | B2 | 10/2013 | Carlson et al. | |
| 9,334,642 | B1 * | 5/2016 | Tanaka ................... | E04B 1/2403 |
| 9,932,734 | B1 * | 4/2018 | Winter .................. | E04B 1/1903 |
| 2015/0104538 | A1 | 4/2015 | Sugahara | |
| 2015/0107183 | A1 * | 4/2015 | Imai ....................... | E04B 1/4157 52/701 |
| 2018/0347222 | A1 * | 12/2018 | Richards ................. | E04H 9/021 |

(Continued)

FOREIGN PATENT DOCUMENTS

| CN | 2764233 Y | 3/2006 |
|---|---|---|
| CN | 201419476 Y | 3/2010 |

(Continued)

OTHER PUBLICATIONS

Machine translation DE102009023598A1 (Year: 2010).*
Machine translation JP2000084979A (Year: 2005).*
Machine translation JP2012207515A (Year: 2012).*
English Abstract and Machine Translation for Chinese Publication No. CN2764233Y, published Mar. 15, 2006, 8 pgs.

(Continued)

*Primary Examiner* — Francisco W Tschen
*Assistant Examiner* — Wayne K. Swier
(74) *Attorney, Agent, or Firm* — Fredrikson & Byron, P.A.

(57) ABSTRACT

A support frame of a machine base includes a first element to be joined to the upper or lower end face of a vertical support column of the machine base and extending in the horizontal direction, and a second element spaced from the first element on the opposite side from the support column and extended in the horizontal direction. The end face of the support column joined to the first element is formed with one or more first protrusions which extend to reach the second element and join to it.

16 Claims, 8 Drawing Sheets

(56) References Cited

U.S. PATENT DOCUMENTS

| | | | |
|---|---|---|---|
| 2018/0370102 A1* | 12/2018 | Murata | B29C 45/64 |
| 2019/0009837 A1* | 1/2019 | Takii | B62D 21/03 |

FOREIGN PATENT DOCUMENTS

| | | | | |
|---|---|---|---|---|
| CN | 206495320 U | | 9/2017 | |
| CN | 109204577 A | | 1/2019 | |
| DE | 102009023598 A1 | * | 1/2010 | B29C 45/1761 |
| EP | 1459863 B1 | | 8/2011 | |
| JP | S54089106 U | | 6/1979 | |
| JP | 2000084979 A | * | 3/2000 | B29C 45/1761 |
| JP | 2008000943 A | | 1/2008 | |
| JP | 201012720 A | | 1/2010 | |
| JP | 2012207515 A | * | 10/2012 | |
| JP | 201577715 A | | 4/2015 | |
| JP | 2019014060 A | | 1/2019 | |

OTHER PUBLICATIONS

English Abstract and Machine Translation for Chinese Publication No. CN201419476Y, published Mar. 10, 2010, 5 pgs.

English Abstract and Machine Translation for Chinese Publication No. CN206495320U, published Sep. 15, 2017, 9 pgs.

English Abstract and Machine Translation for Chinese Publication No. CN109204577A, published Jan. 15, 2019, 12 pgs.

English Abstract and Machine Translation for Japanese Publication No. JP2019-014060A, published Jan. 31, 2019, 15 pgs.

English Abstract for Japanese Publication No. 2015077715 A, published Apr. 23, 2015, 1 pg.

English Abstract and Machine Translation for Japanese Publication No. 2010012720 A, published Jan. 21, 2010, 7 pgs.

English Machine Translation for Japanese Publication No. JPS54-089106U, published Jun. 23, 1979, 7 pgs.

English Abstract and Machine Translation for Japanese Publication No. JP2008-000943A, published Jan. 10, 2008, 13 pgs.

* cited by examiner

MACHINE BASE OF INJECTION MOLDING MACHINE

CROSS-REFERENCE TO RELATED APPLICATION

This application is based upon and claims the benefit of priority from Japanese Patent Application No. 2018-196609 filed on Oct. 18, 2018, the contents of which are incorporated herein by reference.

BACKGROUND OF THE INVENTION

Field of the Invention

The present invention relates to a machine base of an injection molding machine.

Description of the Related Art

As disclosed in Japanese Laid-Open Patent Publication No. 2010-012720, an injection molding machine is provided with a machine base that supports a clamping unit and an injection unit.

SUMMARY OF THE INVENTION

The assembly work of the machine base typically includes a positioning process in which scribe lines are drawn to mark on support frames (top and bottom frames) at designated positions, and a joining process in which uprights are joined to the support frames. In addition to the above assembly work, there are cases where reinforcement work for adding extra reinforcements to the support frame is needed in order to reduce the risk of the machine base being deformed by the load or weight of the clamping unit and the injection unit.

The above assembly work which needs exact placement and alignment of the parts on the accurate scribe lines and the reinforcement work for adding extra parts only for enhancing the stiffness of the support frames, are both rather troublesome for the worker.

It is therefore an object of the present invention to provide a machine base of an injection molding machine that is easy to assemble and that can secure rigidity without performing extra work beyond the assembly work.

The invention resides in a machine base of an injection molding machine that supports at least one of a clamping unit and an injection unit, comprising: a support frame extending in a horizontal direction; and a support column extending in a vertical direction intersecting the horizontal direction, wherein the support frame includes: a first element, to be joined to an upper or lower end face of the support column, and extending in the horizontal direction, a second element spaced from the first element on an opposite side from the support column and extended in the horizontal direction, and a third element connecting the first element and the second element, and wherein either the upper or lower end face of the support column is joined to the first element, and the joined end face is formed with one or more first protrusions which extend to reach the second element and join thereto.

The machine base of an injection molding machine according to the present invention can be easily assembled. In addition, the machine base of an injection molding machine according to the present invention can ensure rigidity without extra work being performed beyond the assembly work.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Machine bases for an injection molding machine of the present invention will be detailed below by describing a preferred embodiment and modified examples with reference to the accompanying drawings.

Embodiment

Figure 1:
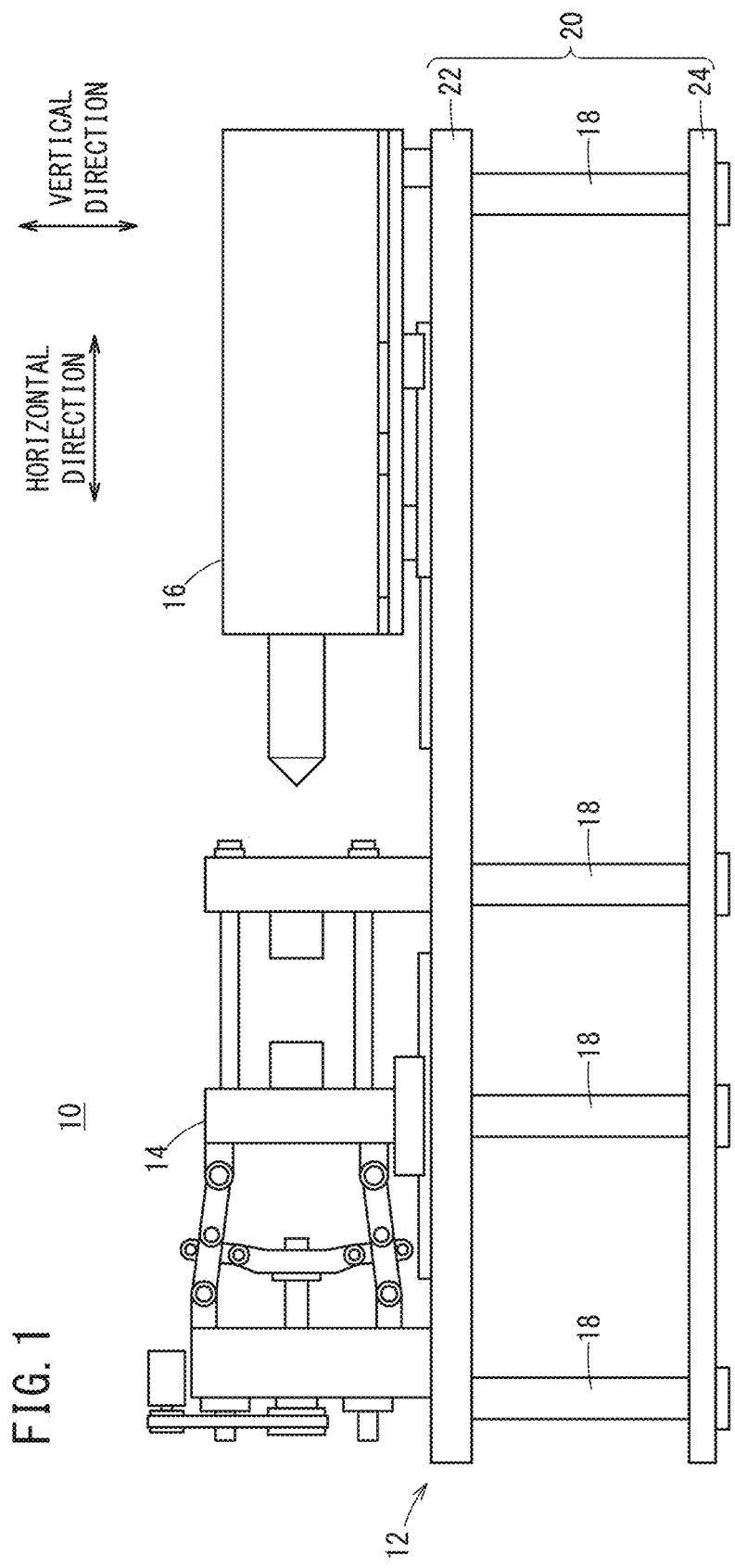
FIG. 1 is a side view of an injection molding machine according to an embodiment.
Figure 2:
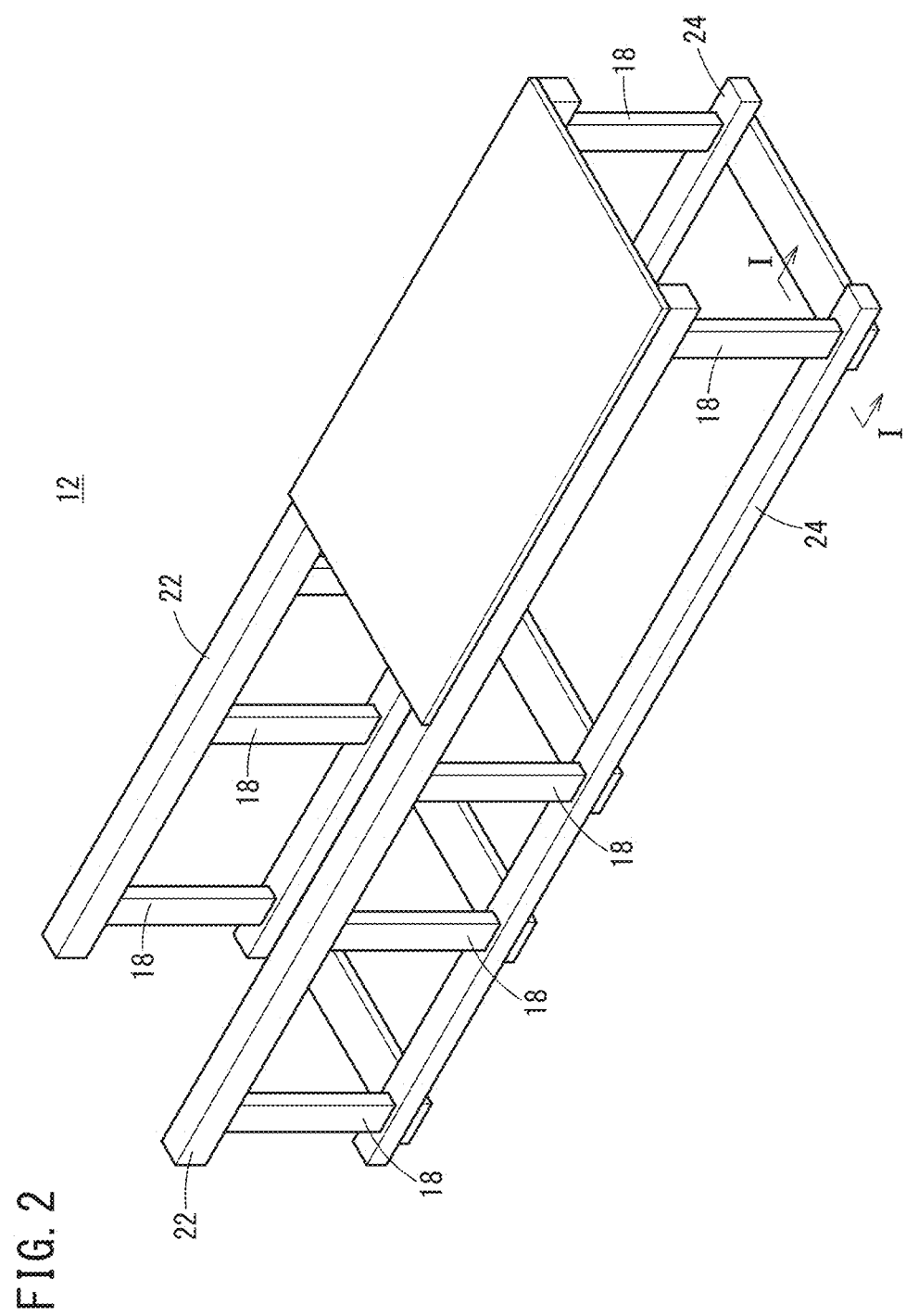
FIG. 2 is a perspective view of a machine base of an injection molding machine according to an embodiment.

FIG. 1 is a side view of an injection molding machine 10 according to an embodiment. FIG. 2 is a perspective view of a machine base 12 of the injection molding machine 10 according to the embodiment.

The injection molding machine 10 includes the machine base 12 and a clamping unit 14 and an injection unit 16 supported by the machine base 12. The machine base 12 includes plural support frames 20 extending in the horizontal direction and plural support columns 18 extending in the vertical direction. The "horizontal direction" herein, is, as indicated by the arrows in FIG. 1, the direction parallel to the direction in which the mold is clamped when molding is performed by the clamping unit 14 and the injection unit 16. Also, the "vertical direction" herein is, as indicated by the arrows in FIG. 1, the direction of gravity that is orthogonal to the horizontal plane. The support frames 20 are classified into top frames 22 that support the clamping unit 14 and the injection unit 16 from below and are joined to upper end faces of the support columns 18, and bottom frames 24 that are disposed at position lower than the top frames 22 and joined to lower end faces 18a of the support columns 18 (see FIG. 3).

To describe the configuration of the machine base 12 in more detail, the following description of the support frame 20 is focused on the bottom frame 24 for simplicity. However, it should be noted in advance that the description of the bottom frame 24 may be applied to the top frame 22 bearing in mind that the vertical direction is reversed. Further, as shown in FIG. 2 two bottom frames 24 of the machine base 12 are arranged apart from each other, but the configuration of one bottom frame 24 may also be applied to the other bottom frame 24. Therefore, in the following, only one of the two bottom frames 24 will be described.

Figure 3:
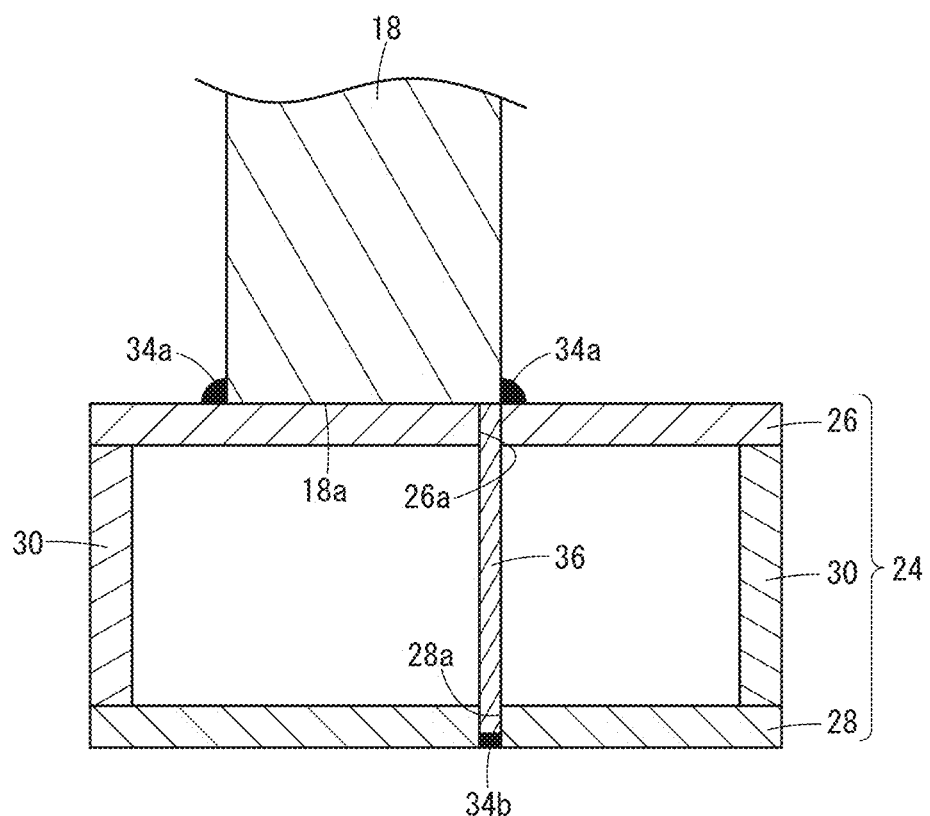
FIG. 3 is a sectional view taken along a line I-I in FIG. 2.
Figure 4:
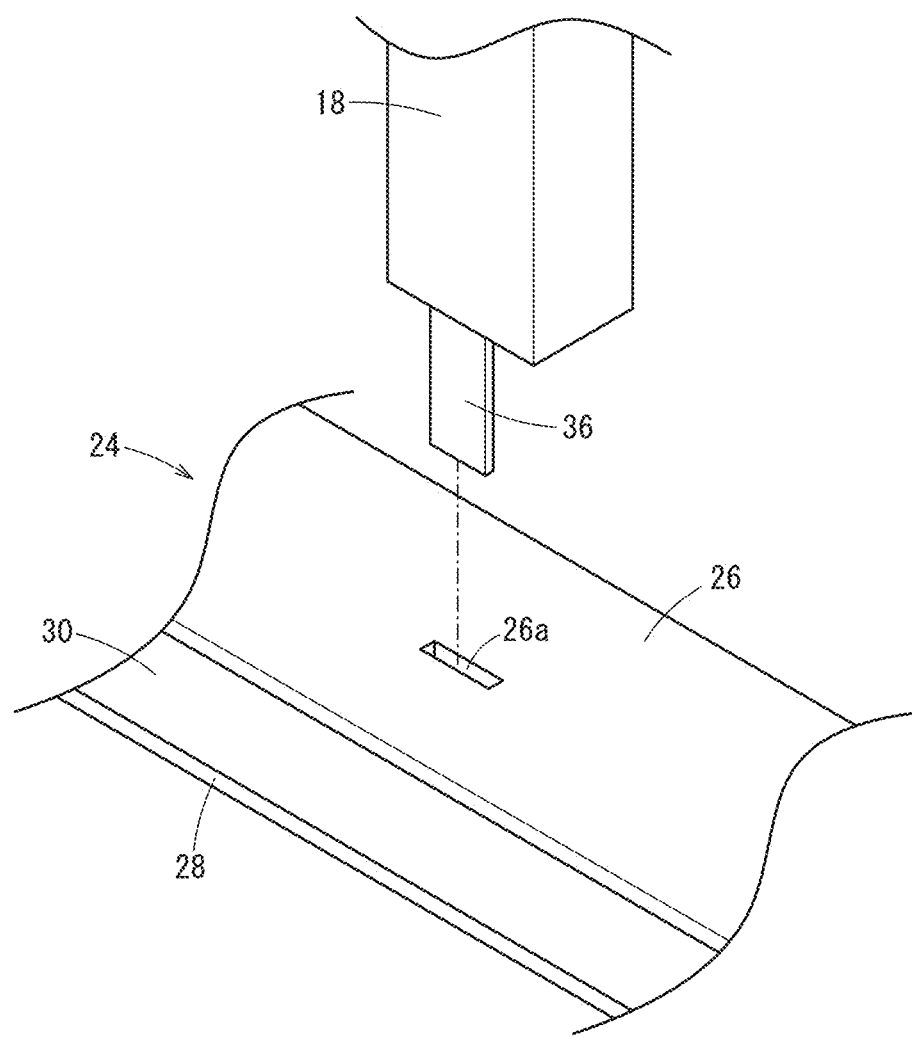
FIG. 4 is a perspective view showing a state in which a bottom frame and a support column of an embodiment is being assembled.

FIG. 3 is a sectional view taken along a line II in FIG. 2. FIG. 4 is a perspective view showing a state in which the bottom frame 24 and the support column 18 of the embodiment are being assembled.

As shown in FIG. 3, the bottom frame 24 of the machine base 12 is a pipe-shaped member made of a steel material, including a first element 26, a second element 28 and two third elements 30 that connect the first element 26 and the second element 28. The first element 26 is extended in the horizontal direction with its upper surface welded to the lower end face 18a of the support column 18 via first weld joints 34a as shown in FIG. 3. The first element 26 is previously formed with a through hole 26a that vertically penetrates the first element 26. As shown in FIG. 4, the through hole 26a of the first element 26 has a slit-like shape.

The second element 28 extends in the same horizontal direction as the first element 26, and is a member spaced from the first element 26 on the opposite (downward) side from the support column 18. The second element 28 is also formed in advance with a through hole 28a that vertically penetrates the second element 28. Though not illustrated, the through hole 28a of the second element 28 has a slit shape corresponding to the through hole 26a of the first element 26. The through holes 26a, 28a may also be round holes. Round holes have an advantage that they can be easily formed by a machine tool equipped with a drill. The through holes 26a, 28a may have different shapes, but at least the through hole 26a should have a shape whose area is smaller than that of the lower end face 18a of the support column 18 so that the support column 18 cannot drop into the bottom frame 24.

Provided on the lower end face 18a of the support column 18 of the machine base 12 is a first protrusion 36 extending in a range below the upper surface of the second element 28 and above the lower surface of the second element 28. As shown in FIG. 3, the first protrusion 36 of the present embodiment penetrates through the through hole 26a of the first element 26 and is inserted into the through hole 28a of the second element 28. The first protrusion 36 is welded to the second element 28 via a second weld joint 34b by welding through an opening on the lower side of the through hole 28a of the second element 28. The first protrusion 36 of the present embodiment has a rectangular shape whose cross section is similar to the shape (slit) of the through hole 26a. However, if the through hole 26a is round, the cross section of the first protrusion 36 may also be circular. In addition, the first protrusion 36 may be welded to the upper surface of the first element 26.

In FIGS. 3 and 4, only one first protrusion 36 is provided for one support column 18, but plural first protrusions 36 may be provided for one support column 18. When plural first protrusions 36 are provided, a corresponding number of through holes 26a of the first element 26 and through holes 28a of the second element 28 may be provided.

Thus, the lower side of the machine base 12 of the present embodiment is configured. In the present embodiment, the first protrusion 36 that extends from the lower end face 18a of the support column 18 to the second element 28 and is welded to the first element 26 and the second element 28, secures the rigidity of the bottom frame 24.

The first weld joints 34a and the second weld joint 34b are formed in the joining process in the assembly work of the machine base 12. Therefore, in the machine base 12 of the present embodiment the necessary rigidity can be secured as described above without extra work being performed separately from the assembly work.

Further, since the first protrusion 36 is formed with the support column 18 and the first element 26 has the through hole 26a, the assembly work of the machine base 12 can be performed easily and accurately. That is, when assembling the machine base 12, the operator inserts (penetrates) the first protrusion 36 into the through hole 26a of the first element 26, thereby arranging and positioning the support column 18 at the predetermined position of the bottom frame 24, easily and accurately. Note that the precision of the arrangement at this work can be adjusted as appropriate depending on the settings of the shapes of the first protrusion 36 and the through hole 26a of the first element 26. For example, it is ideal from the viewpoint of positioning accuracy that the first protrusion 36 fits (inserts) into the through hole 26a without any gaps. However, there may be gaps between the through hole 26a and the first protrusion 36 as long as the gaps fall within a tolerance range allowable by the operator.

As already described, plural through holes 26a of the first element 26 and first protrusions 36 can be provided. Therefore, for example, plural through holes 26a provided in the first element 26 and plural first protrusions 36 corresponding thereto can be arranged in a specific pattern. Thereby, the operator can recognize the correct arrangement of all the members more easily and exactly based on the arrangement pattern of the through holes 26a and the arrangement pattern of the first protrusions 36. Additionally, the work of assembly the machine base 12 may be automated by an industrial robot that is configured to recognize the arrangement pattern of the first protrusions 36 and the arrangement pattern of the through holes 26a by means of a visual sensor and perform the positioning process and the joining process based on the recognized information.

As have been described heretofore, the machine base 12 of the present embodiment is easy to assemble and can assure rigidity without extra work being performed separately from the assembly work.

MODIFIED EXAMPLES

Though the above embodiment has been described as one example of the present invention, it goes without saying that various modifications and improvements can be added to the above embodiment. It is apparent from the scope of claims that the embodiment added with such modifications and improvements should also be incorporated in the technical scope of the invention.

Modified Example 1

Figure 5:
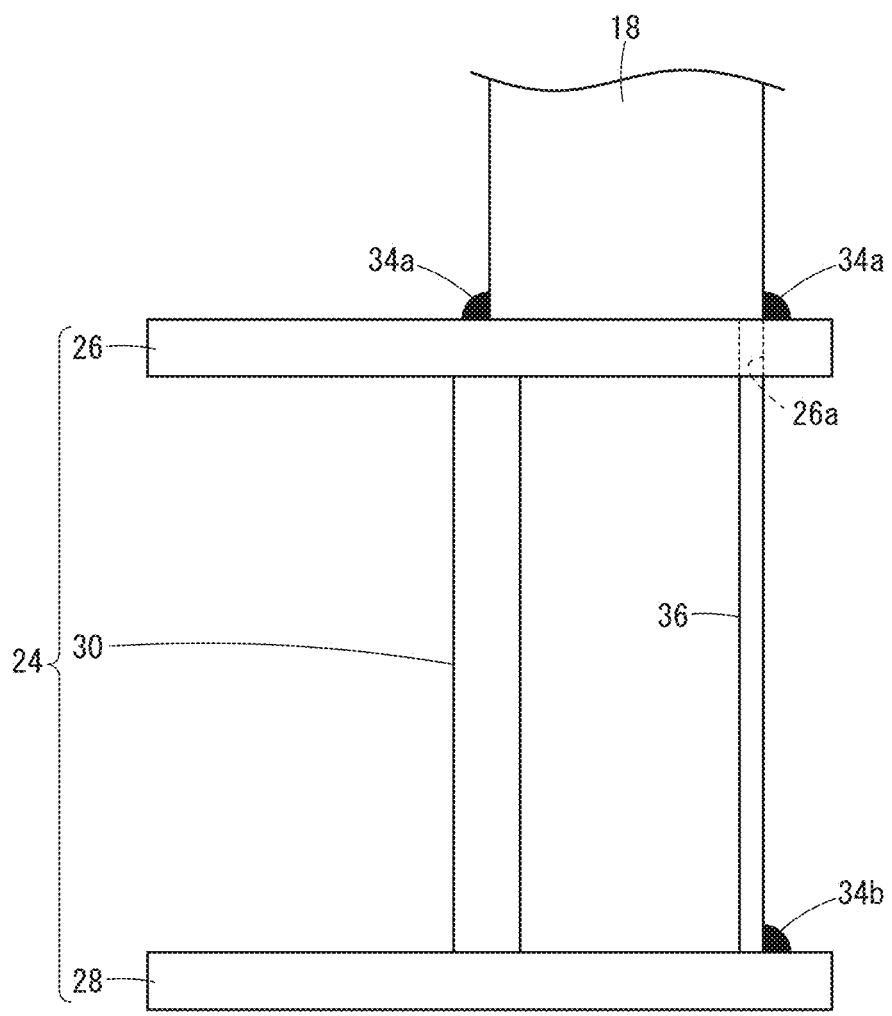
FIG. 5 is a partial section of a machine base of a modified example 1.

FIG. 5 shows a partial section of a machine base 12 of a modified example 1.

A bottom frame 24 may be a laterally laid H-shaped member (H-steel) which is formed of a first element 26 and a second element 28 connected by a third element 30. Even with the bottom frame 24 made of H-steel, use of the structure in which a first protrusion 36 penetrates a through hole 26a of the first element 26 as shown in FIG. 5 enables the operator to perform easy positioning of the support column 18 to the first element 26 in the assembly work.

Further, in use of the bottom frame 24 made of H-steel, the second element 28 does not need to be formed with a through hole 28a that allows the first protrusion 36 to be welded from below the second element 28. The first protrusion 36 does not need to extend beyond the upper surface of the second element 28. That is, when the bottom frame 24 is made of H-steel, unlike the case of the pipe shape, the first protrusion 36 penetrating through the first element 26 will not be hidden by the first element 26, the second element 28 and the third element 30. Thus, the worker can easily perform welding work from the side of the first protrusion 36 to weld the first protrusion 36 reaching the upper surface of the second element 28 to the second element 28.

Modified Example 2

Figure 6:
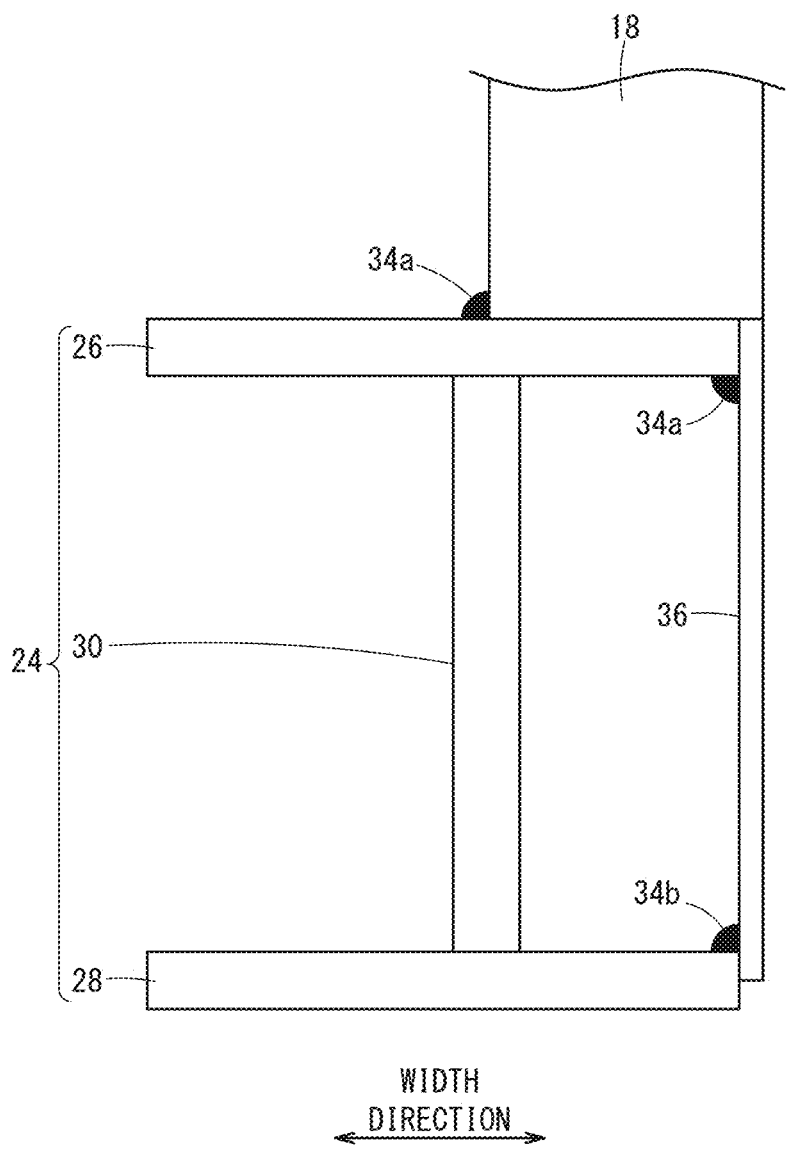
FIG. 6 is a partial section of a machine base of a modified example 2.

FIG. 6 shows a partial section of a machine base 12 of a modified example 2.

The first protrusion 36 only needs to extend to the second element 28 and does not have to penetrate the first element 26. For example, as shown in FIG. 6 the first protrusion 36 may extend close to the side surfaces of the first element 26 and the second element 28 of the bottom frame 24. In this case, the first protrusion 36 may be welded to the side surfaces of the first element 26 and the second element 28.

Thus, even when the first protrusion 36 does not penetrate the first element 26, the support column 18 and the bottom frame 24 can be easily positioned with respect to the width direction (indicated by the arrow in FIG. 6). In addition, since the first protrusion 36 is joined to the first element 26 and the second element 28, the strength of the bottom frame 24 can be enhanced.

Modified Example 3

Figure 7:
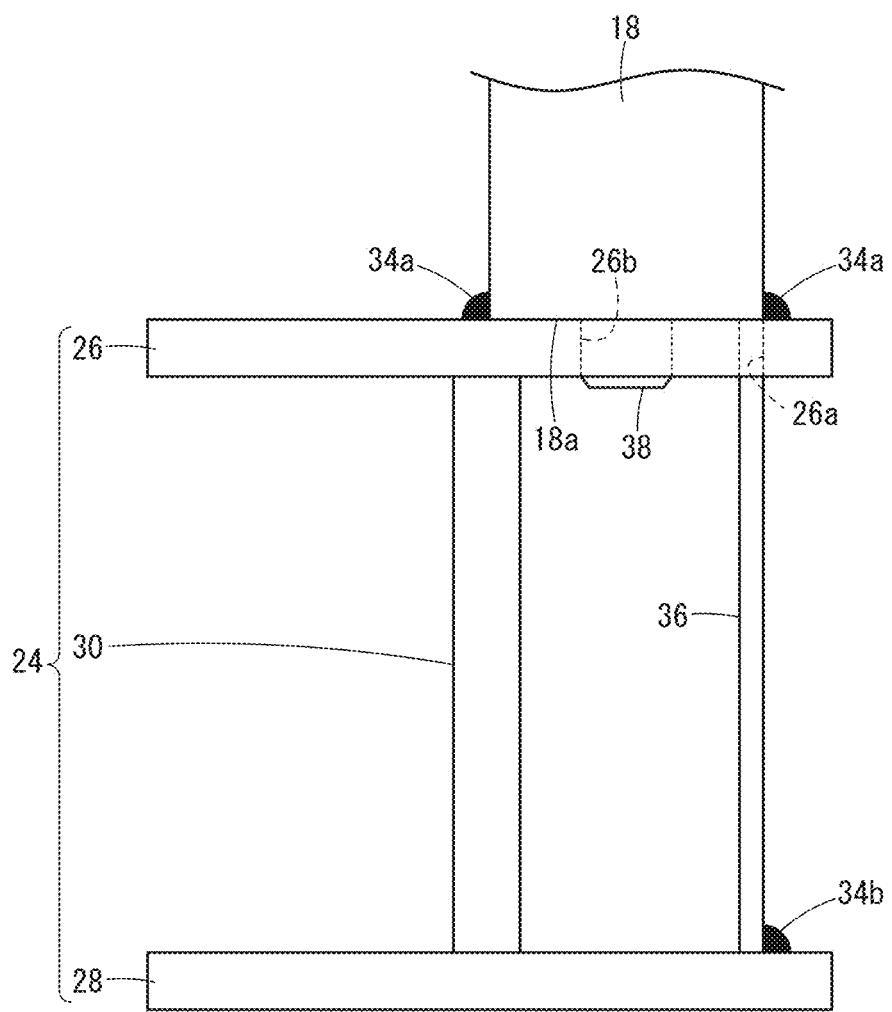
FIG. 7 is a partial section of a machine base of a modified example 3.

FIG. 7 shows a partial section of a machine base 12 of a modified example 3.

A second protrusion 38 for positioning that extends in a length not reaching the second element 28 may be provided on the lower end face 18a of the support column 18. In this case, the first element 26 may be formed with a positioning insertion hole 26b mating the second protrusion 38. Further, the insertion hole 26b may be a through hole or an indentation having a depth corresponding to the length of the second protrusion 38. Further, the second protrusion 38 inserted in the first element 26 may be welded to the first element 26 of the bottom frame 24.

In the machine base 12 having the above structure, the second protrusion 38 and the insertion hole 26b serve as marks in the assembly work, so that the operator can easily and accurately position the support column 18 and the bottom frame 24.

Modified Example 4

Figure 8A:
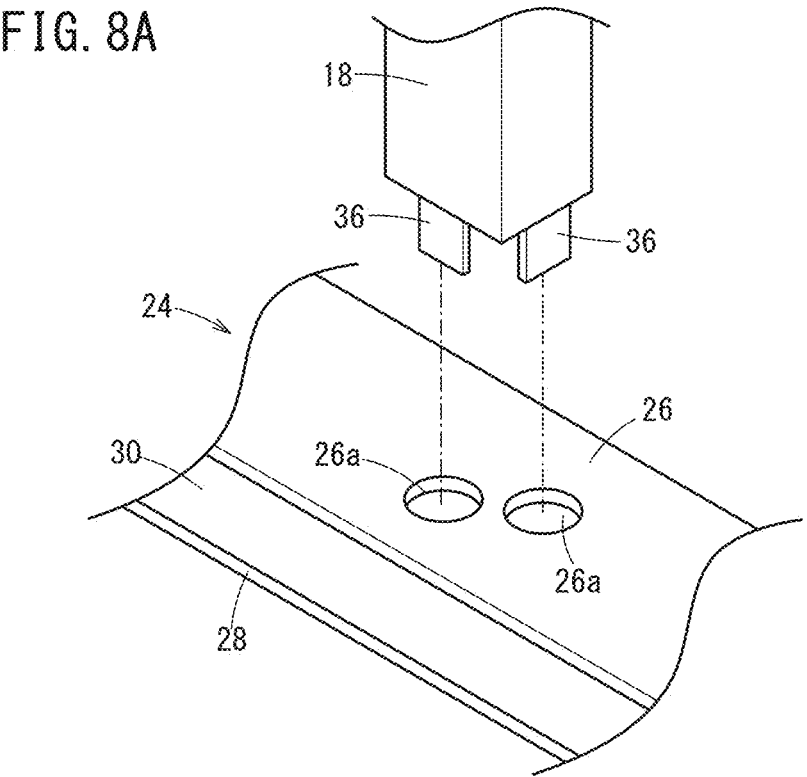
FIG. 8A is a perspective view showing one example of a machine base of a modified example 4 in which a bottom frame and a support column are being assembled.
Figure 8B:
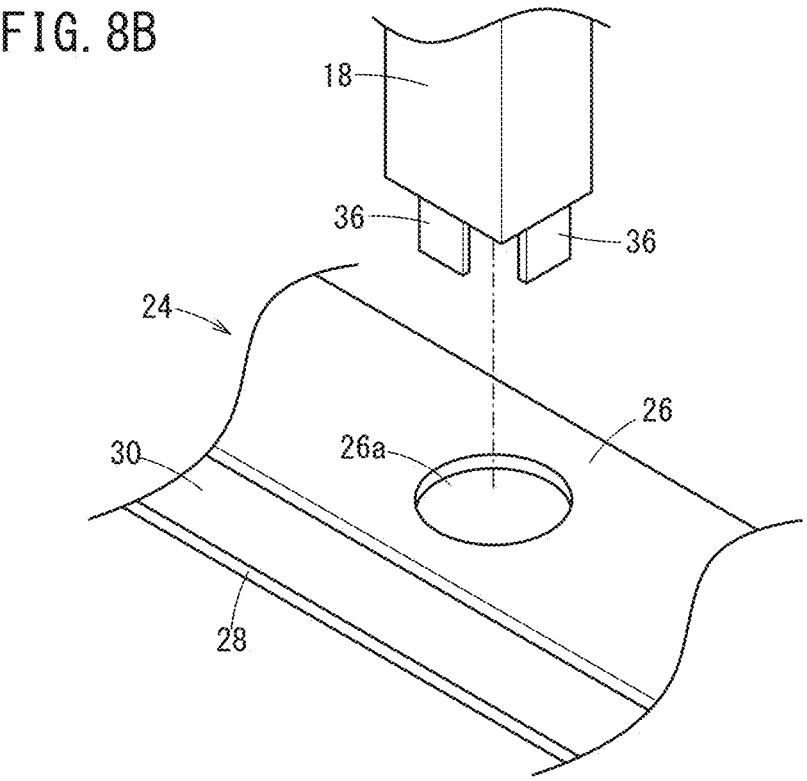
FIG. 8B is a perspective view showing another example of a machine base of the modified example 4 in which a bottom frame and a support column are being assembled.

FIG. 8A is a perspective view showing a state in which a bottom frame 24 and a support column 18 are being assembled in one example of a machine base 12 of a modified example 4. FIG. 8B is a perspective view showing a state in which a bottom frame 24 and a support column 18 are being assembled in another example of a machine base 12 of a modified example 4.

The shape of a first protrusion 36 and the shape of a through hole 26a need not necessarily be similar to each other. For example, as shown in FIG. 8A, the first protrusion 36 may have a rectangular cross section and the through hole 26a may be a round hole. Further, as shown in FIG. 8B, plural first protrusions 36 may correspond to a single through hole 26a of the first element 26. Even in this case, it is possible to recognize the arrangement of all the components with a certain degree of accuracy during assembly. Moreover, setting the through hole 26a larger than the first protrusion 36 facilitates insertion.

Further, a pattern (FIG. 8A) in which one first protrusion 36 corresponds to one through hole 26a of the first element 26 and another pattern (FIG. 8B) in which plural first protrusions 36 correspond to one through hole 26a of the first element 26 may be used in combination. Combination of plural patterns enables more easy distinction between different components in positioning.

Modified Example 5

The lower end face 18a of the support column 18 and the first element 26 may be joined by a known method other than welding. Similarly, joining between each of the first element 26 and the second element 28 and the first protrusion 36 may be done by a known method other than welding. Another known method is, for example, bonding with an adhesive.

Modified Example 6

The machine base 12 may support at least one of the clamping unit 14 and the injection unit 16.

Modified Example 7

The above embodiment and modified examples may be combined as appropriate as long as no technical inconsistency occurs.

INVENTIONS OBTAINED FROM THE EMBODIMENT

The inventions that can be grasped from the above embodiment and modified examples will be described below.

The machine base (12) of the injection molding machine (10) that supports at least one of the clamping unit (14) and the injection unit (16) includes: the support frame (20) extending in a horizontal direction; and the support column (18) extending in a vertical direction intersecting the horizontal direction, wherein the support frame (20) includes the first element (26), to be joined to the upper or lower end face (18a) of the support column (18), and extending in the horizontal direction, the second element (28) spaced from the first element (26) on an opposite side from the support column (18) and extended in the horizontal direction, and the third element (30) connecting the first element (26) and the second element (28) wherein either the upper or lower end face (18a) of the support column (18) is joined to the first element (26), and the joined end face, is formed with one or more first protrusions (36) which extend to reach the second element (28) and join thereto.

This configuration makes it easy to assemble the machine base (12) of the injection molding machine (10), and ensures the rigidity of the machine base (12) without extra work being performed separately from the assembly work.

The support frame (20) may be a pipe-shaped member in which the first element (26) and the second element (28) are connected by two third elements (30), and the one or more first protrusions (36) may be configured to penetrate the first element (26) and are inserted into through holes (28a)

formed in the second element (28). As a result, the strength of the machine base (12) is improved without extra work being performed separately from the assembly work. Further, the first protrusion (36) can be welded to the second element (28) through the lower side opening of the through hole (28a) of the second element (28). Therefore, the worker can easily perform the joining process in the assembly work.

The support frame (20) may be a laterally laid H-shaped member formed of the first element (26), the second element (28) and the third element (30) connecting the first and second elements (28). Thereby, the operator can easily perform the welding process for welding the first protrusion (36) and the second element (28) from the side of the first protrusion (36). Therefore, the worker can easily perform the joining process in the assembly work.

The one or more first protrusions (36) may be configured to penetrate the first element (26). Thereby, the operator can easily perform the welding process for welding the first protrusion (36) and the second element (28) from the side of the first protrusion (36). Therefore, the worker can easily perform the joining process in the assembly work.

At least one of the first protrusions (36) penetrating the first element (26) may be inserted into the second element (28). Similarly to the above, this configuration enables the operator to easily perform the welding process for welding the first protrusion (36) and the second element (28) from the side of the first protrusion (36). Therefore, the worker can easily perform the joining process in the assembly work.

Either the upper or lower end face (18a) of the support column (18) is joined to the first element (26), and the joined end face (18a) may be formed with one or more second protrusions (38) which are inserted into the first element (26) and but do not reach the second element (28). Thereby, the operator can easily perform the positioning process in the assembly work.

The second protrusion (38) may be joined to the first element (26). Thereby, the second protrusion (38) and the first element (26) are fixed to each other.

The machine base (12) of the injection molding machine (10) may further include: the top frame (22) configured to support at least one of the clamping unit (14) and the injection unit (16) and join to the upper end face of the support column (18); and the bottom frame (24) arranged below the top frame (22) and configured to join to the lower end face (18a) of the support column (18). Herein, the support frame (20) may include at least one of the top frame (22) and the bottom frame (24). The support frame (20) may be either the top frame (22) or bottom frame (24) of the machine base (12). Thereby, the assembly of the machine base (12) of the injection molding machine (10) is made easy, and the rigidity of the machine base (12) is ensured without extra work being performed separately from the assembly work.

What is claimed is:

1. A machine base of an injection molding machine that supports at least one of a clamping unit and an injection unit, comprising:
    a support frame extending in a horizontal direction; and
    a support column extending in a vertical direction intersecting the horizontal direction,
    wherein the support frame includes:
    a first element to be joined to an upper or lower end face of the support column, and extending in the horizontal direction;
    a second element spaced from the first element on an opposite side from the support column and extended in the horizontal direction; and
    a third element connecting the first element and the second element, and
    wherein the second element includes a first surface and a second surface arranged in the vertical direction, the second surface being more toward the opposite side than the first surface,
    either the upper or lower end face of the support column is joined to the first element, and the joined end face of the support column is formed with one or more first protrusions which extend through a through hole in the first element to reach a through hole in the second element and
    a distal end of the one or more first protrusions is located between the first surface and the second surface in the vertical direction and is welded to the second element through a second-surface-side opening of the through hole in the second element.

2. The machine base of the injection molding machine according to claim 1, wherein:
    the support frame is a pipe-shaped member in which the first element and the second element are connected by two third elements; and
    the one or more first protrusions are configured to penetrate the first element and are inserted into through holes formed in the second element.

3. The machine base of the injection molding machine according to claim 1, wherein the support frame is laterally laid H-shaped member formed of the first element, the second element and the third element connecting the first and second elements.

4. The machine base of the injection molding machine according to claim 3, wherein the one or more first protrusions are configured to penetrate the first element.

5. The machine base of the injection molding machine according to claim 4, wherein at least one of the one or more first protrusions penetrating the first element is inserted into the second element.

6. The machine base of the injection molding machine according to claim 1, wherein either the upper or lower end face of the support column is joined to the first element, and the joined end face is formed with one or more second protrusions which are inserted into the first element and but do not reach the second element.

7. The machine base of the injection molding machine according to claim 6, wherein the second protrusion is joined to the first element.

8. The machine base of the injection molding machine according to claim 1, further comprising:
    a top frame configured to support at least one of the clamping unit and the injection unit and join to the upper end face of the support column; and
    a bottom frame arranged below the top frame and configured to join to the lower end face of the support column,
    wherein the support frame includes at least one of the top frame and the bottom frame.

9. The machine base of the injection molding machine according to claim 2, wherein either the upper or lower end face of the support column is joined to the first element, and the joined end face is formed with one or more second protrusions which are inserted into the first element and but do not reach the second element.

10. The machine base of the injection molding machine according to claim 3, wherein either the upper or lower end face of the support column is joined to the first element, and the joined end face is formed with one or more second protrusions which are inserted into the first element and but do not reach the second element.

11. The machine base of the injection molding machine according to claim 4, wherein either the upper or lower end face of the support column is joined to the first element, and the joined end face is formed with one or more second protrusions which are inserted into the first element and but do not reach the second element.

12. The machine base of the injection molding machine according to claim 5, wherein either the upper or lower end face of the support column is joined to the first element, and the joined end face is formed with one or more second protrusions which are inserted into the first element but do not reach the second element.

13. The machine base of the injection molding machine according to claim 5, further comprising:
- a top frame configured to support at least one of the clamping unit and the injection unit and join to the upper end face of the support column; and
- a bottom frame arranged below the top frame and configured to join to the lower end face of the support column,
- wherein the support frame includes at least one of the top frame and the bottom frame.

14. The machine base of the injection molding machine according to claim 6, further comprising:
- a top frame configured to support at least one of the clamping unit and the injection unit and join to the upper end face of the support column; and
- a bottom frame arranged below the top frame and configured to join to the lower end face of the support column,
- wherein the support frame includes at least one of the top frame and the bottom frame.

15. The machine base of the injection molding machine according to claim 9, further comprising:
- a top frame configured to support at least one of the clamping unit and the injection unit and join to the upper end face of the support column; and
- a bottom frame arranged below the top frame and configured to join to the lower end face of the support column,
- wherein the support frame includes at least one of the top frame and the bottom frame.

16. A machine base of an injection molding machine that supports at least one of a clamping unit and an injection unit, comprising:
- a support frame extending in a horizontal direction; and
- a support column extending in a vertical direction intersecting the horizontal direction,
- wherein the support frame includes:
- a first element to be joined to an upper or lower end face of the support column, and extending in the horizontal direction;
- a second element spaced from the first element on an opposite side from the support column and extended in the horizontal direction; and
- a third element connecting the first element and the second element, and
- wherein the second element includes a surface being more toward the first element with respect to the vertical direction, and an outer-side surface in a width direction that is perpendicular to the horizontal direction and the vertical direction, of an upper end face and a lower end face of the support column, an end face joined to the first element of the support column is provided with one or more first protrusions extending in the vertical direction and being welded to the second element, and
- a distal end of the one or more protrusions is in contact with the surface or the outer-side surface.

* * * * *